Harvey A. Alexander
Inventor

By Samuel H. Davis
Attorney

Patented Aug. 5, 1947

2,425,077

UNITED STATES PATENT OFFICE 2,425,077

COMBINATION TENDON EXTRACTOR AND FOOT AND HEAD SEVERING DEVICE

Harvey A. Alexander, Lansing, Mich.

Application January 25, 1945, Serial No. 574,537

2 Claims. (Cl. 17—11)

This invention relates to a combination tendon or sinew extractor and a foot and head severing device that may be advantageously used in hotels, restaurants, poultry markets, refrigerating lockers and even private homes where fowls are cleaned and prepared for table use.

Applicant is familiar with tendon pullers now on the market, most of which are fastened to the wall and thus cause the weight of the turkey to hang from its leg or legs, which has a tendency to break the skin and flesh of the drumsticks when the tendons are pulled loose, causing an unsightly carcass.

Further, other tendon pullers usually extract the tendons from one leg at a time, while applicant detaches them from both legs at one and the same time.

Further, applicant's invention not only detaches the tendons, but shears off the feet and head after tendons are pulled; thus greater speed and neatness is attained in preparing turkeys or the like for edible purposes.

Referring to the drawings:

Fig. 3 is a partial left side view taken on line 3—3 of Fig. 1;

Fig. 4 is a cross section of the rounded portion of the handle taken on line 4—4 in Fig. 1 showing secured therein the raised, slotted plate with the W-shaped rod passing through the plate; and Fig. 5 is a vertical section of part 11.

Throughout the drawings and description the same number is used to refer to the same part.

Figure 1:
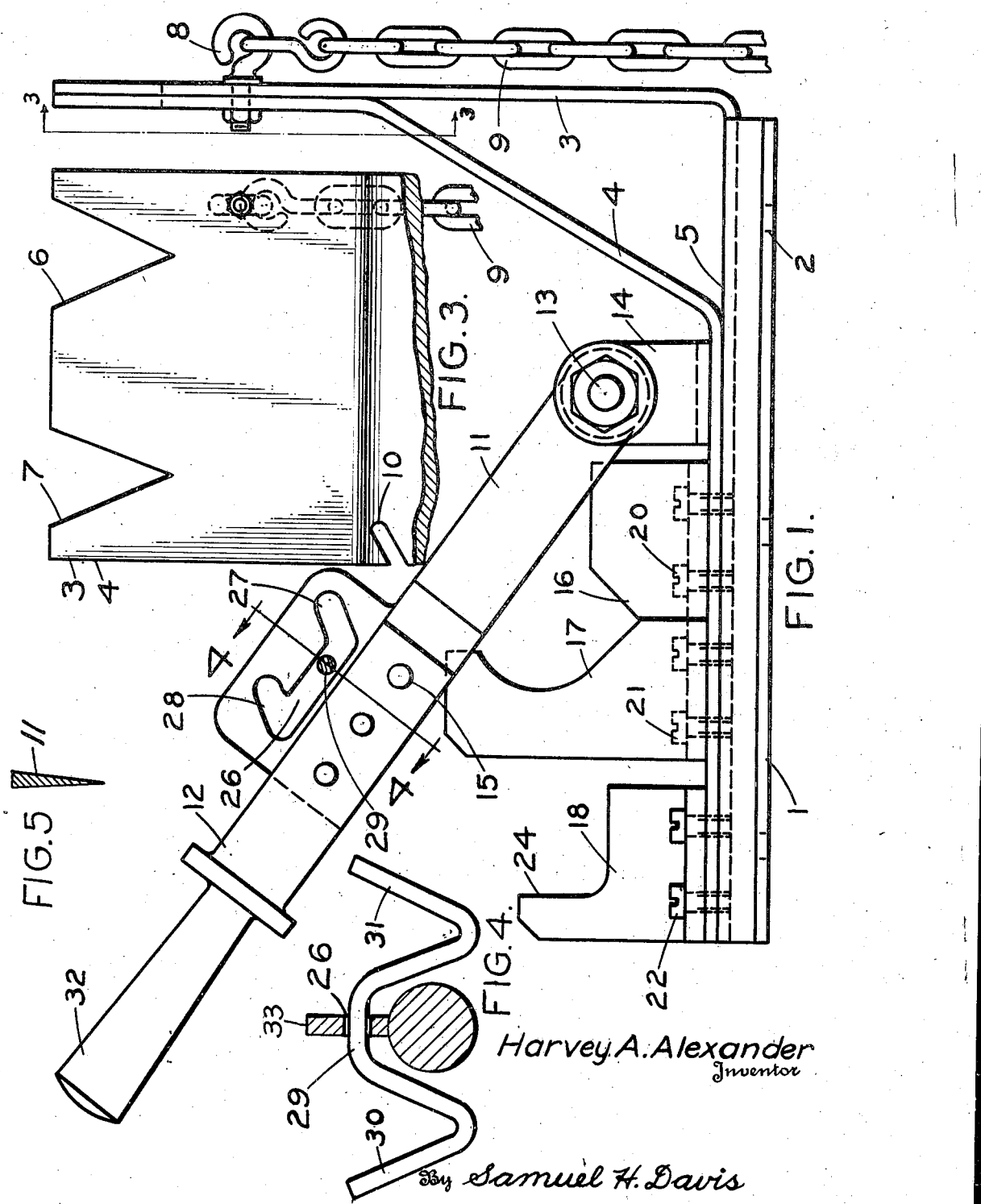
Fig. 1 is a front elevation view of the device with parts broken away.
Figure 2:
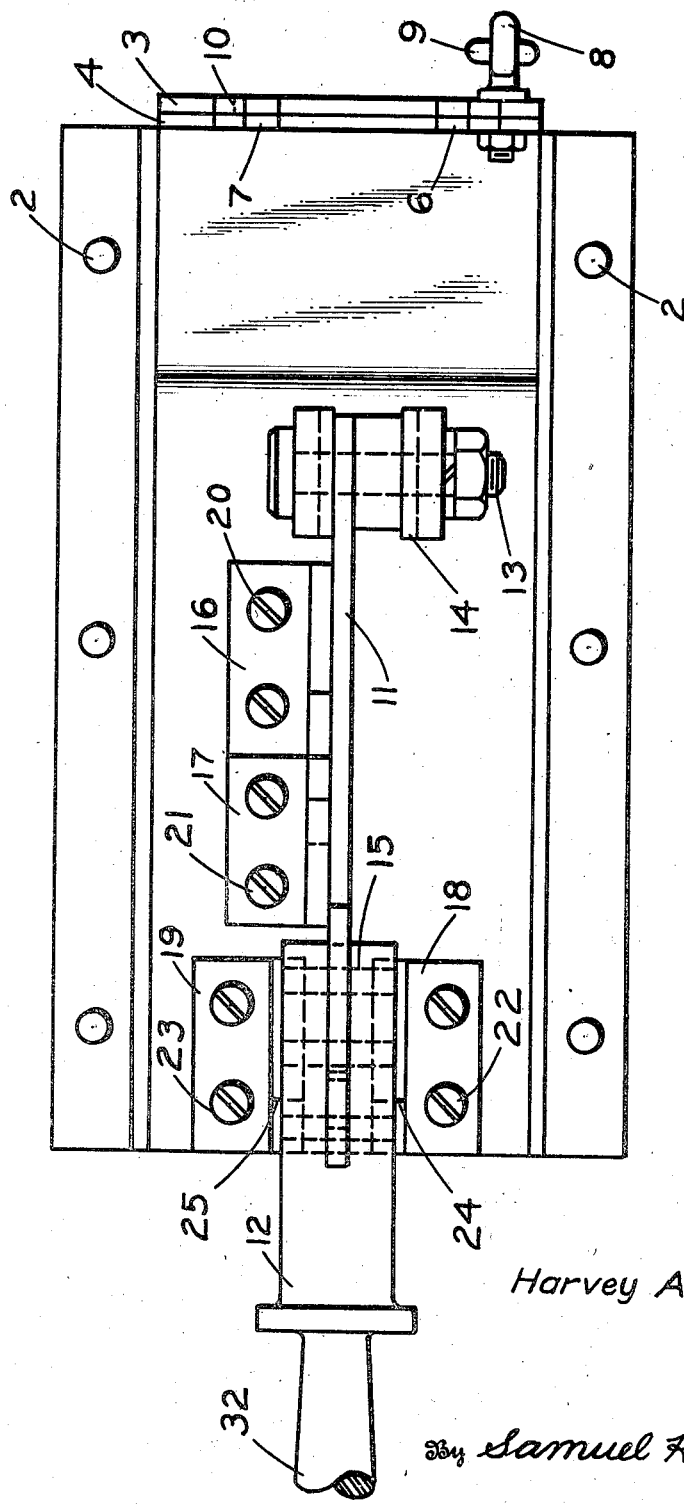
Fig. 2 is a plan view.

This device comprises a base 1 in which are holes 2, through which screws may pass, if it is desired, to fasten the machine to a table or bench, though this invention will be serviceable if located without the necessity of fastening permanently in any one place. To base 1 is fastened an auxiliary base 5, made a part thereof, and one end of 5 is formed at right angles to 1 as shown by numeral 3. Part 4 is fastened to 5 and formed obliquely and at right angles to 5 to form a brace for 3 and fastened by welding thereto as shown. V-shaped apertures 6 and 7 are cut into the upper parts of 3 and 4 as shown in Fig. 3. Attached to 3 and 4 is an eyebolt 8 and chain 9 as shown in Figs. 1 and 3. A notch 10 is cut into 3 as shown in Fig. 3. A knife made of two parts 11 (cutting edge) and 12 (rounded) has a fulcrum pin 13 supported by a U-shaped part 14 fastened by welding to part 4. Parts 11 and 12 are fastened together by pins 15. To the left of the fulcrum support 14 (Figs. 1 and 2) are tool steel cutting-off blocks 16 and 17 and to the left of these are tool steel leg breaking blocks 18 and 19. Parts 16, 17, 18 and 19 are secured to assembly base 1 by screws 20, 21, 22 and 23. Parts 18 and 19 have upright portions 24 and 25. On 12 is fastened a plate 33 with cut-away portions 26, 27 and 28. In this cut-away part is slipped a W-shaped part 29 (Fig. 4). Part 12 is extended to form the gripping handle 32.

The operation of this device is as follows:

First, the legs of the fowl (just above the feet) are laid, one at a time, across the breaking parts 18 and 19 and against pieces 24 and 25. The round part 12 of the knife is forcibly brought against the legs at this point, thus breaking the bone just above the feet. The feet of the fowl are then placed in the V slots 6 and 7 (the feet hanging to the left). The knee joints are placed to the right on the uprights 3 and 4 so that the shanks of the legs as they become wedged in slots 6 and 7 will not be pulled to the left of uprights 3 and 4. To hold the fowl still more securely, chain 9 is brought up and over the legs and secured in slot 10, Fig. 3. The W-shaped part 29 is then inserted in slot 26 of plate 33 and then raised and brought into 27. The lower part of the legs below the break in them is placed in the V's 30 and 31 of the W 29. As the handle 32 is pulled to the left (Fig. 1) the leg tendons are pulled loose in the upper portion of the leg (drumstick). If the tendons are not all pulled loose, part 29 is then placed in slot 28 to secure greater leverage and the handle is again pulled back. When the tendons are pulled loose from the body of the fowl, the chain is unfastened, the legs removed from 30 and 31 and the fowl removed. The fowl is then placed crosswise of this device, the legs only, one at a time, with the knee joints across parts 16 and 17 and severed by a downward stroke of the handle. The fowl is then reversed and the head severed in the same manner.

After the tendons are extracted, the fleshy part of the leg, especially turkeys, is edible, where otherwise they could not be utilized because of toughness of sinews.

It is to be understood that the structural elements are susceptible to reasonable variations and modifications without departing from the claims of this application.

What I claim is:

1. A combination tendon extractor and head and feet severer of the character described, comprising a base, a reinforced upright at one end of the base, V-shaped means at the top of the upright, a handle pivoted on the base, tool steel cutting and breaking blocks attached to the base, an elongated slot formed in the handle, a W-shaped member mounted loosely in the slot and a chain attached to the upright.

2. A sinew extractor comprising a base, a reinforced upright attached to one end of the base, and having a pair of V-shaped notches formed in the upper end thereof, a chain attached at one end to the upright, means on the upright for securing the other end of the chain, a handle pivotally mounted on the base, said handle being rounded on one end and being provided with a cutting edge on the other, an elongated slot formed in the handle, and a W-shaped piece fitted into the slot.

HARVEY A. ALEXANDER.

REFERENCES CITED

The following references are of record in the file of this patent:

UNITED STATES PATENTS

| Number | Name | Date |
| --- | --- | --- |
| 732,300 | Hollender | June 30, 1903 |
| 787,025 | Congdon | Apr. 11, 1905 |
| 941,759 | Congdon | Nov. 30, 1909 |